Patented Oct. 8, 1946

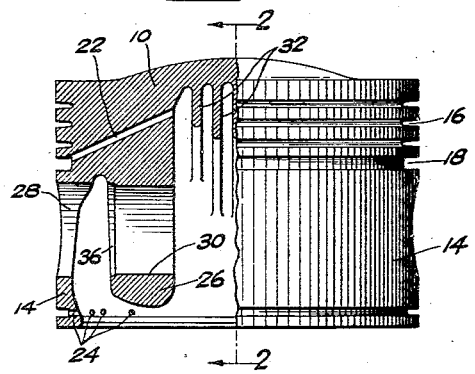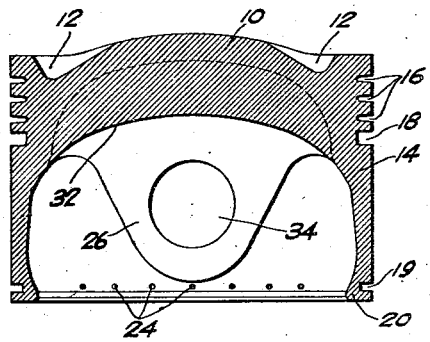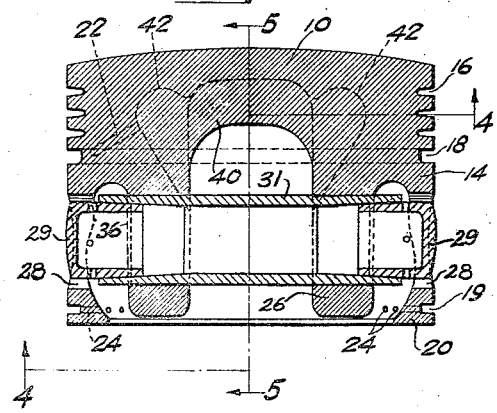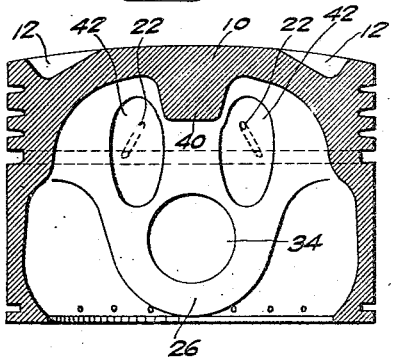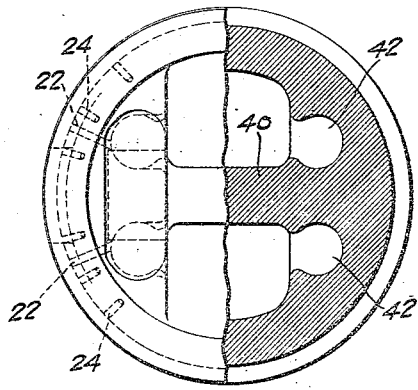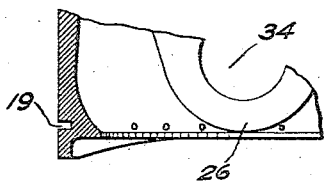

2,408,875

UNITED STATES PATENT OFFICE 2,408,875

PISTON

Wright A. Parkins, West Hartford, Conn., assignor to United Aircraft Corporation, East Hartford, Conn., a corporation of Delaware Application December 3, 1942, Serial No. 467,765

2 Claims. (Cl. 309—8)

This invention relates to improvements in engine pistons.

An object of this invention is to provide a piston having a novel form and metal distribution for producing the characteristics of high strength, lightness, and long life required for pistons used in internal combustion engines, and to effect such improvements in a piston particularly adapted for manufacture by a forging or extrusion process.

Other objects and advantages will be apparent from the specification and claims, and from the accompanying drawing which illustrates what is now considered to be a preferred embodiment of the invention.

In the drawing:

Fig. 1 is a side view, partly in section, of a piston embodying my invention.

Fig. 2 is a sectional view taken along the line 2—2 in Fig. 1.

Fig. 3 is a sectional view of a modification of the piston of Fig. 1.

Fig. 4 is a view, partly in section, taken along the line 4—4 in Fig. 3.

Fig. 5 is a sectional view, taken along the line 5—5 in Fig. 3.

Fig. 6 is a partial sectional view of a further modification.

Engine pistons, and particularly internal combustion engine pistons, are subjected to very high and rapidly changing temperatures and pressures. They must therefore be not only strong but also should be uniform in their response to changing temperatures. In other words, an engine piston should expand and contract uniformly, and remain cylindrical, upon changes in temperature. Further, reciprocating engine pistons must be as light as possible consistent with the more important factors of reliability and strength. According to my invention, these basic factors are provided by a novel form of piston, this form being particularly advantageous where the piston is made of a material such as aluminum alloy which is adapted for manufacture by a forging process.

Referring to the drawing, the piston comprises a head or crown portion 10, which may be provided with valve head accommodating recesses 12, as shown in Figs. 2 and 5, and a cylindrical skirt portion 14 extending downwardly from the rim of the head and providing a bearing portion for the piston against the cylinder wall. Cylindrical grooves 16, 18, and 19 in the skirt receive compression rings for sealing the high pressure side of the piston from the low pressure side thereof, and oil rings for controlling the lubrication of the piston and ring bearing surfaces. A thickened portion or flange 20 is formed at the lower end of the skirt to accommodate the lower ring groove 19. Oil passages 22, 24 connect the ring grooves 18, 19 with the interior of the piston. For securing the piston to a piston rod, and transferring the explosion and inertia forces therethrough to the crankshaft, bosses or piers 26 are integrally attached to the piston head at the upper end of the skirt. Contrary to previous practice, these piston bosses are free from the skirt and are connected to the piston only at the top. The skirt portion of the piston is of uniform thickness and geometry, except for the holes 28, formed for the purpose of machining the holes 34, which provide piston pin bearing surfaces 30, and inserting the piston pin therein. Consequently the skirt will respond uniformly to temperature changes without creating localized stressed or warped portions.

The lateral component of the force exerted by the piston rod on the piston through the pin, which presses the piston against the cylinder wall, is transmitted through the bosses to the piston head and thence through the skirt to the cylinder wall. As the skirt is free from the bosses it will flex or deform uniformly to absorb this lateral load, without restraint by stiffened portions which would be created by the pin and bosses if the bosses were attached to the skirt. Hence, the skirt may be made cylindrical rather than being "cam ground" or machined out of round as is sometimes done in pistons having skirt attached bosses for the purpose of absorbing these lateral stresses.

The bosses are placed close together and toward the center of the piston to decrease the length of the piston pin and increase the beam strength thereof, and to reinforce the central portion of the piston head.

It will be seen that this construction, having the pin bosses suspended from the piston head and spaced from the piston skirt, provides for transmission of the loads directly through the head to the piston pin.

Thus the primary function of the bosses, to transfer the loads on the piston head to the piston rod, is directly and efficiently accomplished with a minimum of metal. Spacing of the bosses from the skirt eliminates skirt warpage and localized stresses which would result from unequal metal thicknesses and temperature gradients such as are present in prior structures having bosses attached to the skirt.

My piston is particularly adapted for manufacture by a forging process, that is, it may be readily shaped both internally and externally by forming dies prior to machining. This method of manufacture is not only economical but effects improved qualities in the piston metal. In order to admit the forming dies to the interior of the piston, it is desirable to form the continuous flange 20 as an external flange during the forging process and then turn it inwardly to produce an internal flange which is machined to the shape shown at 20 in the drawing. If the pin bosses 26 are attached to the skirt, and extend axially of the piston to a point adjacent flange 20, then when the flange 20 is turned inwards during manufacture, a crack or fold or localized stressed portion is formed in the metal, at the bossed portion, because of the greater metal thickness and increased stiffness at this point. This difficulty is obviated in pistons constructed according to my invention because the pin bosses are free from the skirt at the position of the lower flange 20 and hence this flange may be turned or spun in during manufacture without interference with the bosses.

For reinforcing and cooling the piston head, fins 32 may be provided. The piston pin may be held against sideways movement in the holes 34 of the bosses by means of snap rings (not shown) which fit against counterbores 36 of the bosses 26. Piston pin plugs 29, which fit in the ends of the piston pin 31 and have projections bearing against the cylinder wall, may also be used to retain the pin against lateral movement.

In the modification of Figs. 3-5, a rib 40 reinforces the central portion of the head 10 and joins the bosses 26 at the top end thereof. This construction might be considered as a "handle" wherein the "hand portion" (rib 40) is connected to the piston head and the "bail portion" (bosses 26) are connected to the piston rod through the piston pin. The rib contributes materially to the strength of the head and bosses and may be supplemented, if desired, by reinforcing and cooling ribs (not shown) similar to those shown at 32 in Figs. 1-2. For lightening the piston and obtaining the correct piston weight, holes 42 are formed as shown on both sides of the rib 40. The modification of Figs. 3-5 is otherwise similar to Figs. 1-2, except for slight differences in the extent and shape of the bosses 26, flange 20, and the convex or spherical portion of head 10. In both modifications the skirt 14 need not terminate at the flange 20 but may extend below this flange, as is shown in Fig. 6.

It is to be understood that the invention is not limited to the specific embodiment herein illustrated and described, but may be used in other ways without departure from its spirit as defined by the following claims.

I claim:

1. A piston for an internal combustion engine comprising an integral extruded cup including an annular skirt portion open at one end and having a head portion closing the other end thereof, extruded bosses integral with said head extending in the direction of the axis of said piston in free spaced relation with said skirt, said bosses being substantially coextensive with said skirt, a circumferentially continuous inwardly swaged flange extending around the open end of said skirt and overhanging the space between said bosses and said skirt, and a ring groove in the outer surface of said flange.

2. An extruded piston for an internal combustion engine comprising a head, a skirt depending from said head and integral therewith, spaced bosses integral with said head extending in free spaced relation with said skirt and terminating substantially in the plane of the open end of said skirt, a circumferentially continuous inwardly swaged flange around the open end of said skirt projecting inwardly over the interior surface of said skirt, and aligned bores in said bosses for receiving a piston pin.

WRIGHT A. PARKINS.